(12) United States Patent
Le Grand

(10) Patent No.: US 10,117,546 B2
(45) Date of Patent: Nov. 6, 2018

(54) APPLIANCE FOR COOKING BY AIR FLOW

(71) Applicant: SEB S.A., Ecully (FR)

(72) Inventor: Olivier Le Grand, Messigny et Vantoux (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 14/767,619

(22) PCT Filed: Feb. 11, 2014

(86) PCT No.: PCT/FR2014/050254
§ 371 (c)(1),
(2) Date: Aug. 13, 2015

(87) PCT Pub. No.: WO2014/125200
PCT Pub. Date: Aug. 21, 2014

(65) Prior Publication Data
US 2015/0374172 A1    Dec. 31, 2015

(30) Foreign Application Priority Data

Feb. 15, 2013 (FR) ..................... 13 51291

(51) Int. Cl.
| | |
|---|---|
| *A47J 37/07* | (2006.01) |
| *A47J 37/10* | (2006.01) |
| *A47J 36/16* | (2006.01) |
| *A47J 37/06* | (2006.01) |
| *A47J 43/07* | (2006.01) |

(52) U.S. Cl.
CPC ............. *A47J 37/10* (2013.01); *A47J 36/165* (2013.01); *A47J 37/0641* (2013.01); *A47J 37/108* (2013.01); *A47J 43/0716* (2013.01)

(58) Field of Classification Search
CPC ...... A47J 36/165; A47J 37/0641; A47J 37/10; A47J 37/108; A47J 43/0716; A47J 37/06; A47J 36/16; A47J 37/04
USPC .............. 99/324, 330, 447; 126/99 R, 110 R
See application file for complete search history.

(56) References Cited

U.S. PATENT DOCUMENTS 4,162,141 A * 7/1979 West ........................ A21B 1/26
432/144
5,532,456 A * 7/1996 Smith ................... F24C 15/327
110/179
(Continued)

FOREIGN PATENT DOCUMENTS

| CN | 101378824 A | 3/2009 |
|---|---|---|
| CN | 201273307 Y | 7/2009 |
| CN | 201460149    * | 5/2010 |

(Continued)

*Primary Examiner* — Dana Ross
*Assistant Examiner* — Joseph Iskra
(74) *Attorney, Agent, or Firm* — The Webb Law Firm

(57) ABSTRACT

Provided is an appliance for cooking and/or reheating food, which includes: a housing having a cooking vessel arranged such as to receive the food to be cooked and/or reheated, and a circuit for heating by ventilation including an air duct arranged such as to channel and direct a flow of hot air onto the food to be cooked and/or reheated, wherein the air duct has at least one cross-section in which a geometric size of the channeled air flow is limited such as to reduce a turbulence of the air flow flowing downstream from said at least one section of the air duct.

10 Claims, 1 Drawing Sheet

(56) References Cited

U.S. PATENT DOCUMENTS 8,162,151 B2    4/2012   Pauwels et al.
2008/0163764 A1*   7/2008   Payen .................. A47J 37/043
                                                                                     99/447

FOREIGN PATENT DOCUMENTS

| CN | 201460149 U | | 5/2010 |
|---|---|---|---|
| WO | 2012/007681 A2 | | 7/2011 |
| WO | WO2012007681 | * | 1/2012 |

\* cited by examiner

APPLIANCE FOR COOKING BY AIR FLOW

CROSS-REFERENCE TO RELATED APPLICATIONS

This application is the United States national phase of International Application No. PCT/FR2014/050254 filed Feb. 11, 2014, and claims priority to French Patent Application No. 1351291 filed Feb. 15, 2013, the disclosures of which are hereby incorporated in their entirety by reference.

FIELD OF THE INVENTION

This invention pertains, in general, to an appliance for cooking by air flow.

DESCRIPTION OF RELATED ART

In the prior art, there exist appliances for cooking by air flow, which generally comprise an air duct arranged to conduct the stream of air from a fan to the food being cooked. However, these appliances present disadvantages such as being noisy and requiring lengthy cooking times.

One objective of this invention is to remedy the disadvantages of the prior art mentioned above, and in particular, firstly, to provide an appliance for cooking by air flow that operates quietly, and that cooks food quickly.

SUMMARY OF THE INVENTION

To this end, a first aspect of the invention involves an appliance for cooking and/or reheating food comprising:
 A housing with a cooking vessel arranged to receive the food to be cooked and/or reheated,
 A circuit for heating by air flow, comprising an air duct arranged so as to channel and direct a stream of hot air onto the food to be cooked and/or reheated,
characterized in that the air duct has at least one cross-section, downstream of which the turbulence in the air flow is reduced by limiting one geometric dimension of the air stream channeled by said cross-section of the air duct.

The appliance described in this implementation offers the benefit of quiet operation, since the air duct is arranged to reduce turbulence in the air duct. In other words, the air duct is arranged to obtain laminar flow. Consequently, there are no noisy air movements inside the air duct, and the heating efficiency is improved, since the reduction in turbulence also reduces energy loss in the stream. Lastly, the appliance does not require an additional component in order to reduce the turbulence, since the duct itself is what limits the size of the stream. There is no additional cost to obtain laminar flow during operation.

In one method of implementation, the air duct comprises at least two heating means, each comprising a support forming a fin, these at least two fins being arranged facing one another in order to separate, in said at least one section, the air stream into at least three veins of air, each with a thickness that reduces the turbulence of the air stream inside the air duct. The heating means are arranged in the form of a fin in order to limit the thickness of the veins of the air stream, thereby making it possible to effectively redirect the flow of air to reduce/eliminate the turbulent swirling components and obtain laminar flow.

In one method of implementation, the heating means are each a heating means with a heating element coiled around the support.

In one method of implementation, the air duct has one end, upstream, and it has, at a predetermined distance from the upstream end, a gradual reduction of the cross-section, arranged so as to progressively limit said geometric dimension of the air stream channeled along one part of the air duct. The gradual reduction, in this implementation, restores the speed of air flow or re-pressurizes it to avoid a breakaway of the boundary layer and/or dead zones within the air duct. It is important to note that the gradual reduction of the cross-section in this implementation is progressive and not abrupt and/or intermittent, which would have the effect of creating turbulence.

In one method of implementation, the air duct comprises a bend, and the gradual reduction of the cross-section begins upstream of the bend and ends at the bend. It is important to restore the speed of air flow before the bend, in order to avoid creating dead zones and/or recirculation.

In one method of implementation, the gradual reduction of the cross-section upstream of the bend has a curved shape that is continuous with the bend. This implementation prevents turbulence from occurring, as there is no sharp ridge or abrupt change in the cross-section. The flow can remain laminar.

In one method of implementation, the supports forming a fin are arranged upstream of the bend, and they are arranged with a predefined orientation with respect to the air flow, to direct the stream of air in the direction of the bend. The change in air flow direction at the bend is initiated by the orientation of the supports.

In one method of implementation, each oriented support has one surface that is bathed in the stream of air and one surface opposite the bathed surface, and at least one of the supports forming a fin is partially slotted to create an air flow at the element arranged on the opposite surface of the support. The heating is improved by the slots; the opposite surface (the surface "in the wind") is bathed in the air stream, which prevents any overheating of the heating element.

In one method of implementation, at least one of the supports of the heating means is partially arranged facing the gradually reduced cross-section. The division into three veins is combined with the gradual reduction of the cross-section, in order to optimize flow in the zones where it would be turbulent.

In one method of implementation, the air duct has a continuous change in its cross-section downstream of the gradually reduced cross-section. The cross-section of the air duct does not change abruptly or intermittently, which reduces turbulence.

In one method of implementation, the air duct has a consistent cross-section downstream of the gradually reduced cross-section.

In one method of implementation, the appliance comprises a lid, arranged to close a cooking space at the top of the vessel, and one portion of the air duct is arranged inside the lid.

In one method of implementation, the appliance comprises at least one mixing paddle arranged to automatically coat said food with a film of fat by mixing said food with the fat.

In one method of implementation, the appliance forms a dry-cooking fryer.

BRIEF DESCRIPTION OF THE DRAWINGS

Other characteristics and advantages of this invention will be more clearly apparent upon reading the detailed description below of one method of implementing the invention, provided as a non-limiting example and illustrated by the drawings appended hereto, in which.

DETAILED DESCRIPTION OF THE INVENTION

Figure 1:
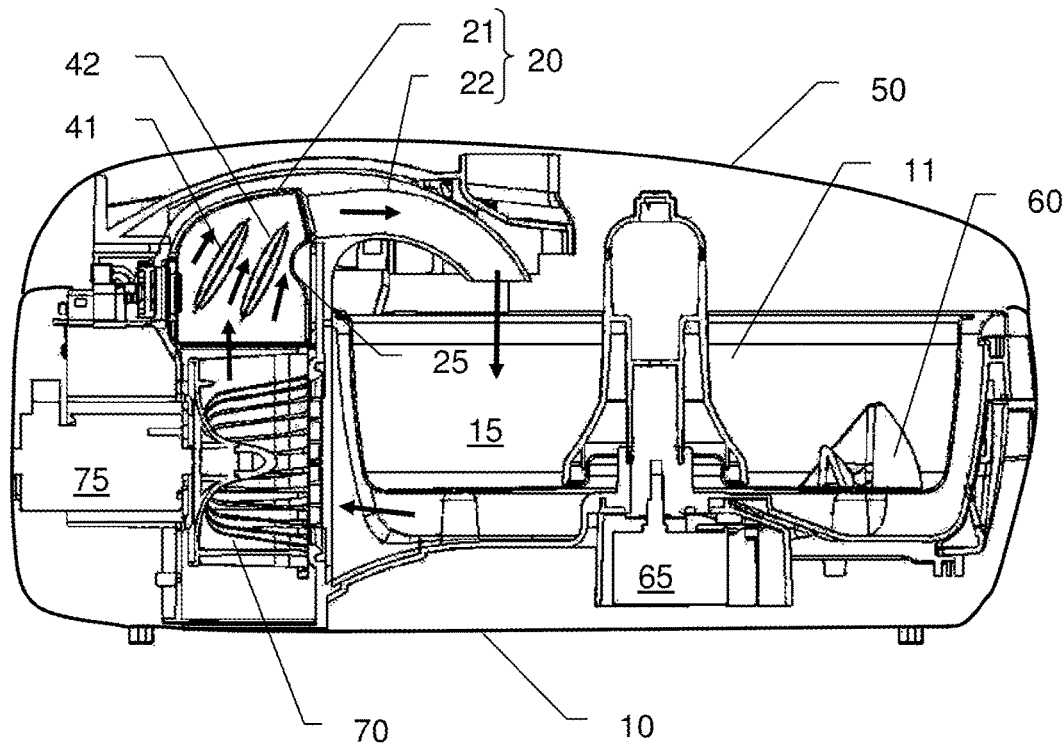
FIG. 1 presents a cross-section view of a cooking appliance described in the invention.

In the invention, the appliance is a household appliance, which means that it is specifically designed and sized for household use, for example, in a family setting. In this respect, the user can carry the appliance by hand, for example, to move it from a cabinet to a work surface. In other words, the appliance is preferably of a portable nature.

The appliance in the invention is preferably designed and sized to cook and/or heat particular foods, such as pieces of potatoes.

The general concept of the appliance in the invention allows for broad multi-purpose use with regard to cooking methods, such that the term "cook" used here covers various methods of food preparation, such as frying, browning, roasting or searing, for example.

In one preferred implementation variant, which corresponds to the examples illustrated in the drawings, the appliance in the invention is preferably designed and sized to apply heat processing to food, for the purpose of giving it taste qualities that are roughly equivalent or close to those of fried foods, and particularly foods fried in an oil bath. In this variant, the appliance described in the invention is therefore a fryer, and more specifically, a dry-cooking fryer. Here, the term "dry cooking" refers to a method of cooking food without submersing it in a bath of oil or fat, whether said submersion would be either partial and/or temporary during the cooking cycle.

On the contrary, the expression "dry cooking" refers to cooking in which the food is, of course, moistened with a cooking medium such as oil, for example, but without being plunged or bathed in said medium. In this respect, the operating principle of the fryer described in the invention differs from that of a traditional deep fryer, since, in particular, it combines the conditions specific to achieving a sufficient Maillard reaction to give food a golden, crispy quality characteristic of fried foods, without plunging said foods completely and directly into a hot oil bath.

FIG. 1 presents a cross-section view of a cooking appliance comprising a housing (10) with a cooking vessel (11) that defines a cooking space (15), closed by a removable lid (50), to allow foods to be placed into or removed from the cooking vessel (11).

A mixing paddle (60), spun by a motor (65), is arranged inside the vessel (11) to stir the food to be cooked and/or reheated there.

The appliance in FIG. 1 comprises an air flow heating circuit with a motorized fan (75) that comprises a paddle wheel (70). The paddle wheel (70) blows air below the vessel (11), and sends it into an air duct (20), which consists of a diffuser (21) forming an upstream portion of the air duct (20) and a conduit (22) forming a downstream portion of the air duct (20). The diffuser (21) is adjacent to the motorized fan (75) and attached to the housing (10), while the conduit (22) is attached to the lid (50), which is removable. The conduit (22) is therefore mobile with respect to the diffuser (21).

The diffuser (21) contains two heating means (41 and 42), each of which comprises one support and one heating element coiled around the support. In addition, the support of each heating means (41 and 42) is arranged in the form of a fin, such that the air flow created by the paddle wheel (70) of the motorized fan (75) and sent into the diffuser (21) of the air duct (20) is separated into three veins of air, each having a thickness that is much smaller than the thickness of the cross-section of the air duct (20) at that location.

The result is that the supports for the heating means (41 and 42) reduce the turbulence, as one of the dimensions of the air stream in each of the three veins of air is limited. Indeed, the Reynolds number, which characterizes the nature of a flow (laminar, transitional or turbulent), is an affine function of the characteristic dimension of that flow. By limiting the characteristic dimension of the flow, one reduces the Reynolds number and reduces the turbulence of the flow, ideally to obtain laminar flow.

The diffuser (21) of the air duct (20) also comprises a gradual reduction of the cross-section (25) arranged facing the support for the heating means (42). The air duct (20) also has a bend to redirect the vertical air flow exiting the paddle wheel (70) toward a horizontal direction in the conduit (22). Such a bend in a pipe traditionally causes breakaways of the boundary layer and/or dead zones in which a recirculation of the air stream occurs. These phenomena lessen the efficiency of the flow and/or generate bothersome noise. In order to limit/eliminate these breakaways of the boundary layer and/or dead zones, the gradual reduction of the cross-section (25) begins upstream of the bend in the air duct (20), in order to increase the speed of the flow and/or pressure of the flow of air in the bend.

It is important to note that the gradual reduction of the cross-section (25) reduces the passage cross-section of the diffuser (21) such that its downstream end is perfectly adapted to the upstream end of the conduit (22) of the air duct (20). The stream of air passing from the diffuser (21) toward the conduit (22) does not encounter any abrupt change in cross-section, which could create turbulence zones. Moreover, the gradual reduction in cross-section (25) has a curved shape, such that the direction of the tangent to the interior wall of the air duct (20) changes continuously between the diffuser (21) and the conduit (22). In other words, there is no protruding ridge at the junction between the diffuser (21) and the conduit (22), again to reduce turbulence and obtain laminar flow in the air duct (20).

The conduit (22) that forms the downstream portion of the air duct (20) has a cross-section that is roughly constant from the diffuser (21) to its outlet arranged at the top of the vessel (11). This constant cross-section prevents the occurrence of turbulence conditions for the air flow, by maintaining the characteristic dimension of the flow at a value corresponding to a Reynolds number within the laminar range.

Figure 2:
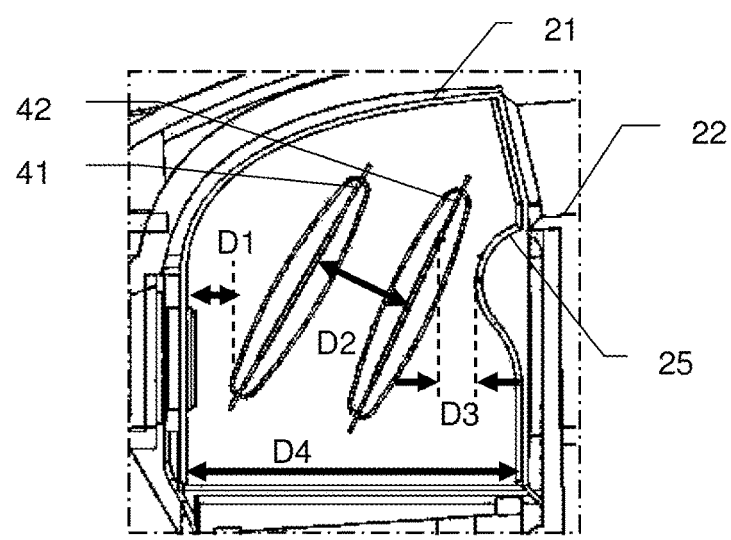
FIG. 2 presents a detailed, enlarged view of the air duct of the appliance in FIG. 1.

FIG. 2 shows the air duct in detail, and in particular the diffuser (21) with the heating means (41 and 42). Generally, this type of cooking appliance has an operating air flow with an output of approximately 150 cubic meters per hour, which corresponds to an average air flow speed of approximately 20 meters per second. At the outlet of the conduit (22) and during cooking, the air is at a temperature of approximately 200° C. to 220° C.

The diffuser (21) has, at the outlet of the fan (in its upstream portion), a cross-section with a width (D4) ranging between 45 and 55 millimeters, and a length (not depicted) ranging between 100 and 110 millimeters. The total surface area of this passage cross-section is therefore approximately 5,250 square millimeters, for a cross-section that is 105 millimeters in length by 50 millimeters in width (D4). A distance (D2) ranging between 5 and 20 millimeters, and ideally between 12 and 18 millimeters, separates the supports forming a fin of the heating means (41 and 42). The support forming one fin of the heating means (42) is arranged at a distance (D3) from the gradual reduction of the cross-section (25), ranging between 5 and 15 millimeters, and ideally between 7 and 9 millimeters. The support forming one fin of the heating means (41) is arranged at a distance (D1) from the wall of the diffuser (21), ranging between 5 and 15 millimeters, and ideally between 7 and 9 millimeters.

It is understood that various modifications and/or improvements that would be obvious to an expert in the field may be made to the various methods of implementing the invention explained in this description, without falling outside the scope of the invention defined by the claims appended hereto.

The invention claimed is:

1. Appliance for cooking and/or reheating food, comprising:
    A housing with a cooking vessel arranged to receive the food to be cooked and/or reheated,
    A circuit for heating by air flow, comprising an air duct arranged to channel and direct a stream of hot air onto the food to be cooked and/or reheated,
    wherein the air duct has at least one cross-section downstream of which the turbulence from the air flow is reduced by limiting one geometric dimension of the stream of air channeled by said cross-section of the air duct,
    wherein the air duct has an elbow and at least two heating means, each heating means comprising a support forming a fin in which the supports are arranged with a predefined orientation with respect to the flow of air, to direct the air stream in the direction of the elbow,
    wherein the supports of the fins are arranged at an angle in a direction of an upstream portion of the elbow to change a direction of a vertical air flow into the elbow,
    wherein an entire portion of each fin is arranged at an angle in the at least one cross-section in a direction of the upstream portion of the elbow such that the fins face one another to separate the air stream into at least three veins of air, each with a thickness reducing a turbulence of the flow of the air stream inside the air duct,
    wherein the air duct comprises one upstream end, having at a predetermined distance from the upstream end, a gradually reduced cross-section arranged to progressively limit said geometric dimension of the air stream channeled along one portion of the air duct, and
    wherein the gradually reduced cross-section begins upstream of the elbow and ends at the elbow.

2. The appliance described in claim 1, wherein the heating means are each a heating means with a heating element coiled around the support.

3. The appliance described in claim 1, wherein the supports forming one fin are arranged upstream of the elbow.

4. The appliance described in claim 3, wherein each oriented support has one surface that is bathed in the air stream and at least one surface opposite a bathed surface, is partially slotted to create an air stream at the element arranged on the opposite surface of the support.

5. The appliance described in claim 1, wherein at least one of the supports of the heating means is arranged facing the gradually reduced cross-section.

6. The appliance described in claim 1, wherein the air duct has a continuous change in cross-section downstream of the gradually reduced cross-section.

7. The appliance described in claim 1, wherein the air duct has a constant cross-section downstream of the gradually reduced cross-section.

8. The appliance described in claim 1, including a lid arranged to close a cooking space at a top of the cooking vessel, and wherein one portion of the air duct is arranged in the lid.

9. The appliance described in claim 1, including at least one mixing paddle arranged to automatically coat said food with a film of fat by mixing said food with the fat.

10. The appliance described in claim 1, defining a dry-cooking fryer.

* * * * *